E. H. BRISTOL.
RECORDING PRESSURE GAGE.
APPLICATION FILED APR. 12, 1906.
1,115,778.
Patented Nov. 3, 1914.
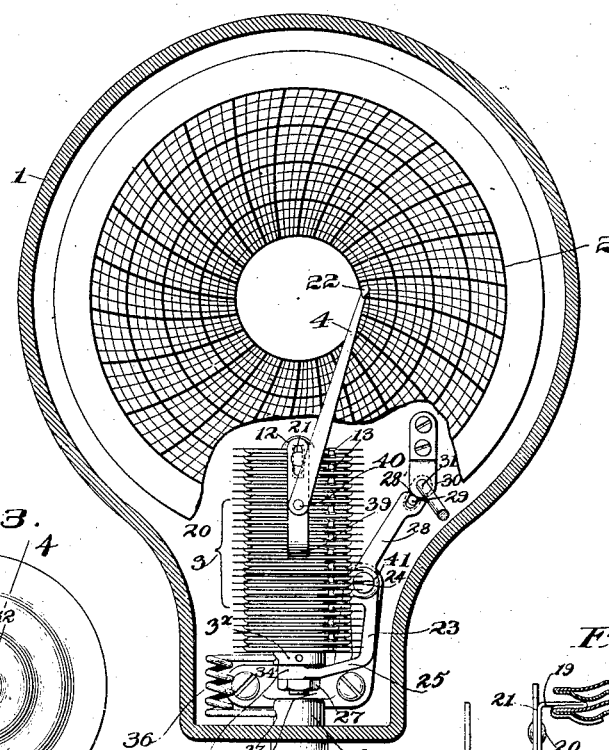
Fig. 1.
Fig. 3.
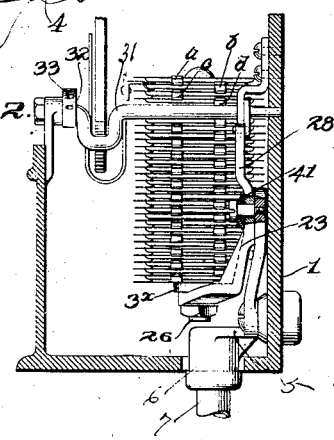
Fig. 2.
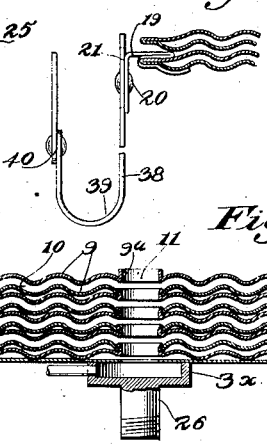
Fig. 5.
Fig. 4.
Witnesses:
Adolph E. Kaiser
Robert H. Kammler
Inventor:
Edgar H. Bristol
by Emery & Booth,
Attys.

UNITED STATES PATENT OFFICE.

EDGAR H. BRISTOL, OF NAUGATUCK, CONNECTICUT, ASSIGNOR TO THE FOXBORO COMPANY, OF FOXBORO, MASSACHUSETTS, A CORPORATION OF MASSACHUSETTS.

RECORDING PRESSURE-GAGE.

1,115,778.   Specification of Letters Patent.   Patented Nov. 3, 1914.

Application filed April 12, 1906. Serial No. 311,256.

*To all whom it may concern:*

Be it known that I, EDGAR H. BRISTOL, a citizen of the United States, residing at Naugatuck, in the county of New Haven, State of Connecticut, have invented an improvement in Recording Pressure-Gages, of which the following description, in connection with the accompanying drawings, is a specification, like letters on the drawings representing like parts.

My invention relates to instruments for indicating or recording pressures and variations thereof.

The type of pressure gages to which my invention relates, in the particular embodiment selected for purposes of illustration, comprises an expansible pressure tube supported at one end and made up of a series of chambered diaphragm sections, a restraining strip arranged on one side thereof, to produce suitable deflections of said tube and a pointer attached thereto, the deflections of which are utilized to measure or indicate the pressure by its movement over a graduated dial or chart. In all of these devices the pressure tube is adapted to be elongated or contracted by increase or diminution of internal pressure and to take advantage of this movement to produce the desired deflection, the restraining strip is secured along one side and acts to prevent elongation of that side while permitting free elongation of the opposite side, the resultant action of the tube of course being a deflection toward the restrained side thereof, or its normal position. As hitherto constructed, the restraining strips referred to, are straight and flat metallic bands secured to the edges of the diaphragm sections by solder necessarily applied to the tube side of the strip and adding more or less weight and foreign substance to that side of the strip. It has been discovered that the presence of this foreign substance or solder on the inner surface of the strip tends to impair the resiliency or efficient action of the strip and consequently of the tube, producing a permanent deflection or "set" thereof, so that while it is easily deflected under variation of internal pressure, a return to its normal position is not readily secured. The deflection of the tube and of the pointer which moves with it, will thus cause the latter to indicate incorrect pressures, rendering the instrument more or less unreliable.

To overcome this defect or objection is one of the objects of my invention, thereby securing a sensitive instrument that at all times will indicate and record the variations of pressure without appreciable error. Another objection to devices of this type, as hitherto furnished to the trade, is evidenced by the fact that they are constructed without simple means of adjustment for moving the tube about its center of motion or deflection; to cause the pen arm connected therewith to swing so that its pen may always coincide in its movements with the radial arcs of the chart.

Another object of my invention is to remedy this defect, by providing simple means by which this adjustment may easily be made at any time, without calling in the aid of an expert or necessitating a return of the instrument to the manufacturers for that purpose or recalibrating.

These and other features of my invention, however will be best understood and appreciated from the following description and drawings of an instrument embodying one form of my invention, the scope thereof being more particularly pointed out in the claims annexed at the end of the specification.

Referring to the drawings,—Figure 1 is a front elevation of a complete instrument selected for purposes of illustration, parts being broken away for clearness of representation; Fig. 2, an elevation of the right side of the tube, its support and adjusting mechanism, the casing being shown in section or broken away; Fig. 3, a plan of the expansion tube; Fig. 4, a vertical section of the bottom of the tube, taken on the line 4—4, Fig. 3, and Fig. 5, a vertical section of the top of the tube showing the form of spring clip at the end of the pen arm, taken on line 5—5, Fig. 3.

In the particular embodiment of my invention herein illustrated, see Figs. 1 and 2, the recording gage comprises a suitable casing 1 in which are supported and arranged the chart 2, and its operating mechanism (not shown), the pressure expansion tube 3 with its marker or inking arm 4, and the flanged support on head 5, upon which the tube is pivotally mounted.

The head 5 is provided with a nipple 6 to receive the pipe 7, which is connected to any fluid containing receptacle, the pressure of which it is desired to indicate or record. The flanges of said head 5 are provided with perforations or screw holes by which it is secured in a usual manner to the back of the casing 1, supporting the tube 3, in an upright position, so that its pen arm 4, swings across the face of the chart 2, and the pen or marker at its upper end moves over the radial and concentric arcs of said chart 2.

The tube 3 is composed of a plurality of connected diaphragm sections 8, a plurality of which are connected at one side of the tube to suitable restraining means, hereinafter described, which produce deflections of the tube when the latter is subjected to variations of pressure. The tube thus has an oscillating movement about its fixed point of support leaving its head or top free to move so that the center of motion or deflection of the tube, is at and about some point, as 24, without the tube.

To provide adequate means for moving the tube or other responsive member about its center of motion that the recording end of the arm 4 may be adjusted always to move upon or coincide with the radial arcs of the chart, I have, in the present instance, see Figs. 1 and 2, provided a mounting for the tube which is pivotally connected with said supporting head 5 at the center of tube motion. This mounting comprises an angular lever, 23, drilled intermediate its ends to receive a pivot screw or stud 24, tapped into the upper end of a vertical arm which extends upwardly from the right end of the flange of the supporting head 5, said stud 24 being placed at the center of motion of the tube.

The lower arm of the lever is L-shaped, its horizontal portion 25 being drilled to receive a threaded axial projection 26 of the tube head and forming a seat for the pressure tube 3, which is secured thereto in a desirable manner, as by a clamping nut 27. The upper arm 28 of said mounting or lever 23, extends to one side of the casing 1, and its upper end is forked or provided with a slot 28', to receive a crank pin 29 on an arm 30 of a horizontal rock spindle 31, suitably journaled at the back and front of the casing. At its outer or forward end this spindle is cranked to receive the edge of the chart and with any suitable means for turning said spindle, in the present instance, a collar 32 having radial openings 33 to receive a pin or the like and by which the spindle may be rocked to oscillate the crank pin the desired amount in either direction and thereby move the tube and its arm to produce the desired adjustment.

To secure the tube in adjusted position the pivot screw or stud has a spring friction washer 41, the washer being dished (Fig. 2) with its edges bearing upon said lever against which it is held by the head of said screw 24. By this arrangement the required adjustment may be made at any time, the pivoted connection of the tube mounting and its support permitting relative motion therebetween to adjust the tube about its center of motion 24 for the purpose stated, and without requiring the use of screw drivers or other tools.

The expansion tube in the present instance (Fig. 4) is built up to the desired length by a plurality of independent sections 8, each formed of two concentrically corrugated ring diaphragms 9, the corrugations of the several diaphragms being parallel to provide an effective tube of short length. The inner and outer peripheries or edges of these diaphragms are suitably united to form an expansion chamber, 10, in each section, communicating with one another and forming a continuous tube by means of the openings 11 in their centers. One of each pair of diaphragms has a central collar 9ª passing through the opening 11 in the center of the adjacent diaphragm of the adjoining section and turned down to form a rigid connection therewith. The opening in the upper diaphragm is closed by a cap or button 12, the lower diaphragm having a head 3ˣ provided with a side opening 34 communicating by means of the flexible tubular coil 36 with a side opening 37 in the head 5, the latter opening 37 communicating with the nipple 6, the pipe 7, and said pressure vessel.

Instead of using a flat strip of metal as hitherto provided for restraining the elongation of one side of the tube as pressure is increased within it, I employ in the present instance, a plurality of spring clips or restraining devices arranged at one side of the tube and spaced laterally and longitudinally from one another. Each of these clips if preferably made of the same metal as that of which the tube is composed, or one in which the coefficient of expansion is approximately the same under the varying temperatures to which the tube is to be subjected. This, however, is not essential as it has been determined that any metal can be used without impairing the efficient action of the tube.

An important feature of my invention resides in the form and manner in which each of the restraining elements or clips 13 Fig. 1, are secured to the expansion tube, enabling said clips 13 to restrain the elongation of one side of the tube as its internal pressure increases, and thereby causing a deflection of said tube without impairing the resiliency of the clips or tube, or preventing their return to the normal or vertical position under normal pressure.

In the particular embodiment of my invention herein illustrated, the ends of each of said clips 13 are bent inward (Figs. 3 and of the tube by said clips, the unrestrained tendency at the opposite side of the tube causes the upper or free end of the tube to be deflected toward or from the restrained side of the tube. In utilizing this movement to indicate or record the pressure to which said deflection is due, the inking pointer or pen arm 4 is suitably connected at some points adjacent the free end or top of the tube.

In the embodiment of my invention herein illustrated the inking pointer or pen arm 4 is composed of a plurality of sections which are adjustably secured together, the lower section terminating in a spring clip 19 which is adapted to embrace the edge of any of the diaphragm sections, preferably an upper one, and by which means it is adjustably attached thereto. For bringing the pen arm 4 into the plane of the chart, the upper part of said clip 19 is bent down, its lower end being provided with a headed stud 20, adapted to slide in a longitudinal slot 21 formed at the upper end of an intermediate section 38. The stud 20 fits closely within the slot 21 constituting a friction joint, and the section 38 is pivotally connected to the pen arm 4 by a friction joint 40, these joints permitting the sections or parts of the pen arm to be held in any desired angular or longitudinal adjustment, so that the ink carrier or pen 22 at the upper end of the pen arm 4 may be placed in any desired position upon the chart 2.

The pen arm is preferably made of flexible material permitting it to be doubled back upon itself, forming a loop 39 to straddle the chart and permitting the tube to be elevated and placed behind it, thus permitting a shorter, more compact and inexpensive casing to be used than is usually provided and especially where a long pen arm is used. By providing means for relative motion between the head which is connected with said pressure receptacle and said tube, which is secured by the pivoted mounting or lever, 23, on which the latter is supported, the tube may be adjusted around its center of motion or deflection 24, to correct any irregularity in the movements of the pen; the collar 33, being rotated sufficiently to move said tube and pen arm for that purpose, the friction washer holding it securely in adjusted position.

The chart or dial 2 to which reference has been made, is graduated with radial arcs and concentric circles corresponding to different pressures and hours of the day and may be caused to rotate by means of a suitable clock-work at any desired rate, preferably once in every twenty four hours.

By means of the pen 22 which carries any suitable inking material, a line may be traced upon the chart corresponding to the varying internal pressures within the pressure tube 3, its flexible connecting tube 36, the tube 6, pipe 7, and the receptacle to which the latter is connected, said line being continuous and constituting a complete record of the pressure and its fluctuations for the twenty-four hours or day, or any fraction thereof, or for any other period in which the chart is caused to rotate.

While in the embodiment of my invention as herein illustrated, the pressure gage is especially adapted for use in recording or indicating pressures, it is, of course, equally adapted for recording pressures above that of the atmosphere below the atmosphere or vacuums, and to be used for or with steam, gas, air, or other fluid. As will readily be apparent, it is also adapted to record changes in the external pressure by maintaining the internal pressure constant, and may be used as a regulator or in connection with barometers, thermometers, and similar recording or indicating devices, my invention not being limited in this respect.

Claims.

1. A pressure indicator comprising an expansion tube provided with a series of expansible sections, a spring restraining clip arranged at a side of said tube and bent inwardly and outwardly between and connected with a plurality of said sections.

2. A pressure indicator comprising an expansion tube provided with a series of expansible sections and a restraining clip having a curved intermediate portion extending radially between adjacent sections and connected with a plurality thereof.

3. A pressure indicator comprising an expansion tube provided with a series of expansible sections, a restraining clip having a curved U shaped portion extending between adjacent sections and connected with a plurality thereof, and an indicating or recording arm connected with said tube and deflected thereby for measuring the pressure to which said tube is subjected.

4. A pressure indicator comprising an expansion tube provided with a series of expansible sections, and a plurality of separated edge clips arranged at a side of said tube, each having engaging members for holding therebetween at constant separation the adjacent edges of a plurality of said sections, said clips together acting as a restraining means for one side of said tube to effect a deflection of the tube upon variation in the pressure to which it is subjected.

5. A pressure indicator, comprising an expansion tube provided with a series of expansible sections, one or more connections secured at a side of said tube each having a portion extended radially relative to the tube and engaging adjacent expansible sections, said connections acting to restrain 4) or transversely to the length of the clip, to overlie the edges of the diaphragms 9, the intermediate portion 14 being shaped to fit into the space or interval between said diaphragms 9 or the sections 8, of the tube and to receive the edge of one of said sections between said portion of bend 14 and said outer bent ends. These restraining elements or clips may be said to be provided with inner and outer folds, 14, 15, closely approaching each other and lying in the same longitudinal plane, the edges of the diaphragm sections 8 being received between said inner and outer folds, the terms inner and outer being used relatively to the center of the tube or its axis. In securing each of said clips 13 to the tube, they are longitudinally arranged at one side thereof with each curved portion or inner fold 14 entering the space between the edges of the two adjacent sections 8 (Fig. 1), each of said edges entering the space between the bent ends or folds 15 and said inner fold 14, until bottomed against the inner surface of an outer fold 15, said clips being held thereon and holding said edges by their clamping action.

When the clips have been placed in desired position upon the edges of the diaphragm solder is applied upon the engaging portions of their ends or folds 15 and the edges of the adjacent diaphragm sections therebetween. Obviously, however, this is not essential as the intermediate folds 14 act as clamping means for holding the edges of the sections therein and separated one from the other. By forming the clips with these sinuous or serpentine folds and by securing them to the tube as described, a sufficient length of resilient material is interposed between adjacent sections to give the desired flexibility to the tube and restrain elongation along the clip side of the tube.

Each of the curved folds 14 of metal interposed between adjacent sections of the tube acts as a spring hinge enabling the tube to be flexed or deflected through a considerable arc, exceeding that possible where straight restraining strips are used, as the latter have not sufficient amount of free flexing surface to permit of desired deflections without causing a permanent deflection or "set". It will readily be apparent that the greater the length of a strip the greater will be the deflection under a given force. By using considerable length of metal between the sections with its surface free from solder, I have provided for large deflections without any danger of impairing or interfering with its resiliency or elasticity, so that when the tube is deflected it will always return to normal position under normal pressure.

These clips are arranged in any desired manner along one side of the tube, a plurality of them being in longitudinal alinement or parallel with the axis of the tube.

As here shown, (Figs. 2 and 3) these clips are separated longitudinally and laterally or are in staggered relation one to the other, the upper clip $a$ connecting the upper two sections, the second $b$ connecting the second and third at a point on the circumferential edges of one side of or laterally displaced from the position of the first clip. The third and fourth clips, $c$ and $d$ are similarly and respectively connected to the 3rd and 4th and the 4th and 5th sections, counting from the top down, and in respective alinement with the first and second clips, the remaining clips being similarly arranged, thus connecting the sections in pairs and forming longitudinal series thereof. By this arrangement a greater flexibility and consequent deflection of the expansion tube is secured than has been possible where a continuous strip is used and furthermore said clips prevent the tube becoming "set" or permanently deflected from its normal vertical position, this tendency being overcome by the distribution of strain effected by separating the clips laterally, by interposing a considerable length of resilient metal between adjoining sections and by utilizing the flexibility of the tube rather than depending upon that of a continuous restraining strip extending from top to bottom of the tube.

In testing or calibrating the instrument which is done before securing said clips permanently in place, they may be slid toward or from each other upon the edges of said diaphragm sections, until the deflections of the tube and its pen arm 4 correspond to the different pressures and the latter swings freely in the plane of the chart 2, when they may be permanently secured or soldered in place. This arrangement of the clips and the method of attaching them to the tube not only permits of fine adjustment of said tube but enables them to be arranged circumferentially around the tube, when desired, so that an elongation of the tube may be utilized. This arrangement of separated clips longitudinally in parallel lines along one side of the tube effects a more perfect balance and action thereof than where a single restraining strip is used and furthermore tends to limit the deflection of the free end of the tube to a vertical plane passing through the axis of the tube and parallel with the face of the chart, each of the longitudinal series of clips 13 being secured at equal distances from said plane to secure such result.

In the operation of gages of this type, variations between the external pressure and the internal pressure to which the tube is subjected cause a contraction or expansion of the several sections and consequently of said tube in the direction of its length. This tendency being restrained at one side the elongation of said side and to produce a deflection of said tube corresponding to variations in tube pressure.

6. A pressure indicator comprising an expansion tube having a series of expansible sections and one or more connections arranged at one side of the tube having reversely bent ends constituting engaging members extending transversely relative to the length of said tube and connected with a plurality of said sections for restraining the elongation of said side to effect a deflection of said tube corresponding to the variations of pressure to which it is subjected.

7. A pressure indicator comprising an expansion tube provided with a series of expansible sections, and a restraining clip arranged at a side thereof having a plurality of reversely bent portions and connected with a plurality of said sections.

8. A pressure indicator comprising an expansion tube provided with a series of expansible sections and a plurality of edge clips, each having a curved portion extending radially between adjacent sections, said clips being arranged at a side of the tube and separated transversely one from another, relative to their length, and connected with a plurality of said sections.

9. A pressure indicator comprising a pressure tube provided with a series of expansible sections and a plurality of edge clips arranged at one side of the tube and connected with a plurality of said sections, each of said clips being separated from the clip attached to an adjacent or adjoining section.

10. A pressure indicator comprising a pressure tube provided with a series of expansible sections, a plurality of edge clips arranged at one side of the tube and connected with a plurality of said sections, and an indicating or recording arm connected with said tube and deflected thereby, said clips being separated one from another to substantially limit the tube deflections and those of its connected arm to a single vertical plane.

11. A pressure indicator comprising an expansion tube having a plurality of expansible diaphragm sections and a plurality of restraining clips, arranged at one side of the tube and each provided with reversely bent ends to engage the edges of adjacent diaphragm sections.

12. A pressure indicator comprising a pressure tube provided with a series of expansible sections, and a plurality of independent restraining clips arranged longitudinally, one above or below another and upon one side of the tube and each connected with a plurality of said sections for restraining the elongation of said side and effecting deflection of said tube as the latter is subjected to variation in pressure.

13. A pressure indicator comprising an expansion tube provided with a series of expansible sections and a plurality of restraining clips arranged longitudinally along one side of said tube and connecting said sections in pairs substantially as described.

14. A pressure indicator comprising an expansion tube provided with a series of expansible sections and a plurality of restraining clips connecting said sections in pairs, adjacent clips being arranged in staggered relation one to another.

15. A pressure indicator comprising an expansion tube provided with a series of expansible sections, and a serpentine clip connected with a plurality of said sections, and acting as restraining means therefor.

16. A pressure indicator comprising an expansion tube provided with a series of expansible diaphragm disk sections and a series of independent clips arranged longitudinally at one side of said tube and each connected with the peripheral portions of a plurality of said sections and acting as restraining means therefor.

17. A pressure indicator comprising an expansion tube provided with a series of expansible sections, and series of independent restraining clips therefor, each series arranged longitudinally at a side of said tube, and each clip connected with a plurality of said sections.

18. A pressure indicator comprising an expansion tube provided with a series of expansible sections and a plurality of restraining clips connecting said sections in pairs, the clips of adjacent sections being laterally separated one from another substantially as described.

19. In a pressure tube, a series of expansible diaphragm sections and a series of restraining devices therefor, each connected with but two adjacent sections and said sections being similarly and separately connected to those adjacent thereto.

20. In a pressure tube, a series of expansible sections and a plurality of restraining devices arranged exteriorly and in parallel lines at one side of said tube, and each independently connecting but two of said sections together.

21. A measuring instrument having a hollow support adapted for connection with a fluid receptacle, an oscillatory mounting for a tube connected therewith, a tube secured thereto, means for relatively adjusting said mounting and its support, and conduit means intermediate said support and said tube and communicating therewith.

22. A measuring instrument comprising a pressure tube, an arm movable therewith, a support for said tube about which it has an oscillatory movement, and connections between said tube and its support for oscillating said tube on its support thereby to adjust the position of said arm.

23. In a measuring instrument, a support, a pressure tube movably connected therewith and having a movement upon and relative to said support, an arm connected with said tube and moving therewith, and means positively to move said tube relative to its support.

24. In a measuring instrument, a device moved by and proportionately to variations in force for measuring the latter, a support, and means intermediate said support and said device to permit relative movement therebetween for adjusting purposes.

25. A pressure tube having a deflecting movement about a center without said tube and provided with an adjustable mounting, a support for said mounting, and means for adjusting said mounting relative to said support to cause said tube to move about said center.

26. In a pressure tube a plurality of expansible sections each provided with parallel surfaces each provided with elevations and depressions arranged to engage with those of adjacent sections to permit the sections to be placed close together.

27. In a device of the class described, a mounting 23, the pressure tube 3 carried thereby, its support 5, and means for relatively adjusting the same and securing them in adjusted position.

28. In a device of the class described, a mounting 23, the pressure tube 3 carried thereby, its support 5 and means for relatively adjusting the same and securing them in adjusted position, and an arm 4 carried by said tube and adjusted by adjustment of said mounting and its tube.

29. In a pressure tube the expansible sections 8 and the restraining clips 13 for connecting the edges of a plurality of said sections.

30. In an instrument of the class described, the combination of an expansible responsive tube, a device governed thereby to be moved concurrently with the response of said tube; indicator means to coöperate with said device to indicate the response of said tube; and means for adjusting said tube and device concurrently relatively to said indicator means, while preserving the relations of said tube and device.

31. A responsive tube for an instrument of the class described comprising, in combination, a plurality of diaphragms positioned face to face and united in pairs at their circumfecences and having mating convexities and concavities nested closely together, each pair of said diaphragms inclosing therebetween a chamber forming a part of the interior of the tube.

In testimony whereof, I have signed my name to this specification, in the presence of two subscribing witnesses.

EDGAR H. BRISTOL.

Witnesses:
  ROBERT H. KAMMLER,
  SIDNEY F. SMITH.